United States Patent
Ren et al.

(10) Patent No.: US 12,516,401 B1
(45) Date of Patent: Jan. 6, 2026

(54) METHOD FOR DESIGNING AND PREPARING SILICON-BASED HIGH-ENTROPY ALLOYS BY USING PHOTOVOLTAIC SILICON WASTE THROUGH COMPENSATION METHOD

(71) Applicant: KUNMING UNIVERSITY OF SCIENCE AND TECHNOLOGY, Yunnan (CN)

(72) Inventors: Yongsheng Ren, Yunnan (CN); Yi Zeng, Yunnan (CN); Wenhui Ma, Yunnan (CN); Bingxi Yu, Yunnan (CN); Guoqiang Lv, Yunnan (CN); Ruopu Li, Yunnan (CN); Kuixian Wei, Yunnan (CN); Zhengxing Wang, Yunnan (CN); Tao Liu, Yunnan (CN); Guoyan Liu, Yunnan (CN); Shengqian Zhang, Yunnan (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 19/259,953

(22) Filed: Jul. 3, 2025

Related U.S. Application Data

(63) Continuation of application No. PCT/CN2025/100687, filed on Jun. 12, 2025.

(30) Foreign Application Priority Data

Aug. 15, 2024 (CN) .......................... 202411121674.7

(51) Int. Cl.
 *C22C 30/02* (2006.01)
 *C22C 1/02* (2006.01)
(52) U.S. Cl.
 CPC ................ *C22C 1/02* (2013.01); *C22C 30/02* (2013.01)
(58) Field of Classification Search
 None
 See application file for complete search history.

(56) References Cited

U.S. PATENT DOCUMENTS

2021/0107799 A1   4/2021   Xi

FOREIGN PATENT DOCUMENTS

| | | | |
|---|---|---|---|
| CN | 106916978 A | 7/2017 | |
| CN | 107445170 A | 12/2017 | |
| CN | 113023732 A | 6/2021 | |
| CN | 114540941 A | * 5/2022 | ............ C30B 15/20 |
| CN | 118206123 A | 6/2024 | |
| JP | 2011121049 A | 6/2011 | |

OTHER PUBLICATIONS

English language machine translation of CN-114540941-A. Generated Aug. 8, 2025. (Year: 2025).*
Notification to Grant Patent Right for Invention, Chinese Application No. 202411121674.7, mailed Nov. 22, 2024 (3 pages).
Qian He et al., "Journal of Central South University (Science and Technology)", Research progress on recovery and utilization of silicon slag and diamond wire saw silicon powder waste during preparation of crystalline silicon solar cells, vol. 55, No. 7, pp. 2456-2467, issuing date Jul. 26, 2024.

* cited by examiner

*Primary Examiner* — Sally A Merkling
(74) *Attorney, Agent, or Firm* — HOWARD M. COHN and Associates, LLC

(57) ABSTRACT

A method for designing and preparing a silicon-based high-entropy alloy by using photovoltaic silicon waste through a compensation method includes the following steps: (1) pretreating the silicon wafer cutting slurry; (2) high-temperature refining and furnace cooling; (3) crushing, and melting with a solvent metal, conducting directional solidification after the metal is completely melted, and furnace cooling; (4) cutting along the interface between the silicon-rich region and the silicon-based alloy to separate and obtain the silicon-rich region; (5) preparing the target metal material according to the composition ratio of the silicon-based high-entropy alloy; and (6) smelting the silicon-rich region and the target metal material, standing and holding at a temperature, pouring into a mold, and furnace cooling to obtain the silicon-based high-entropy alloy.

10 Claims, No Drawings

METHOD FOR DESIGNING AND PREPARING SILICON-BASED HIGH-ENTROPY ALLOYS BY USING PHOTOVOLTAIC SILICON WASTE THROUGH COMPENSATION METHOD

CROSS-REFERENCE TO RELATED APPLICATIONS

The present disclosure is a continuation application of international application PCT/CN2025/100687 filed on Jun. 12, 2025, which claims priority to Chinese patent application No. 2024111216747 filed with the Chinese Patent Office on Aug. 15, 2024, entitled "METHOD FOR DESIGNING AND PREPARING SILICON-BASED HIGH-ENTROPY ALLOYS BY USING PHOTOVOLTAIC SILICON WASTE THROUGH COMPENSATION METHOD", the entire contents of which are incorporated by reference herein.

TECHNICAL FIELD

The present disclosure relates to the field of high-value regeneration and utilization technique for secondary resources, and more particularly to a method for designing and preparing a silicon-based high-entropy alloy by using photovoltaic silicon waste through a compensation method.

BACKGROUND ART

Under the background of promoting the realization of the dual goals "Peak Carbon Dioxide Emissions" and "carbon neutrality", the photovoltaic industry, represented by solar energy as a green and renewable new energy, is showing a momentum of rapid development in China.

Silicon wafers are important components of solar cells. At present, the production and cutting approach thereof is diamond wire cutting technique process. This technique has the advantages of high production efficiency, high control precision, low environmental load in the production procedure, easy recycling of cutting waste, and shallow mechanical damage on the surface of silicon wafers and so on. Since 2018, it has gradually become the mainstream technique and completely replaced the original mortar cutting technique in 2019. During the cutting procedure, the diameter of the diamond wire is 60-80 m, while the thickness of the silicon wafer is generally 170-180 m. The diamond wire needs to be embedded in the silicon ingot to be cut, and the two move relative to each other at the same time. Due to the gaps caused by the cutting, about 35%~40% of the high-purity silicon may be lost, which may be mixed with the $SiO_2$ oxide formed on the high-speed cutting surface, the carbon particles falling from the diamond wire, metal impurities and organic solvents to form the silicon powder waste of the diamond wire cutting.

In the background of the continuous increase in newly installed photovoltaic capacity nowadays, the output of silicon wafers is huge, and a large amount of silicon waste may be generated during its production procedure. According to statistics, in the production of 1 GW silicon wafers, approximately 1,000 tons of silicon waste is simultaneously generated, which, if not recycled, lead to waste of a lot of resources, economic benefit loss, environmental pollution and other problems. The state strongly supports the research and development of solid waste resource utilization technique. Therefore, the secondary utilization of silicon resources should be vigorously promoted, and green, high-value, and efficient silicon resource treatment technique should be explored to achieve stepwise disposal and value-added utilization of silicon wafer cutting waste. This can not only reduce silicon resource consumption and carbon emissions, reduce environmental pollution, but also create huge economic benefits, reduce the production cost of the photovoltaic industry, and promote the sustainable development of the photovoltaic field, and has great practical significance for achieving the "dual carbon" goal.

Since China's diamond wire cutting technique has only achieved large-scale production in recent years, the recycling of silicon waste is still in its primary stage. Domestic and foreign researchers have encountered the following difficulties in their conducted studies: (1) purification and recycling: current studies still have shortcomings such as the failure to achieve simultaneous control or removal of the oxide layer and impurities; (2) preparation of catalytic materials: complex processing steps are required to obtain suitable surface properties; and (3) preparation of lithium-ion battery materials: the nano-silicon anodes have expensive synthesis cost and low actual energy density.

Therefore, how to recycle and reuse silicon waste is an urgent problem that the person skilled in the art needs to solve.

SUMMARY

In view of this, the purpose of the present disclosure is to provide a method for designing and preparing a silicon-based high-entropy alloy by using photovoltaic silicon waste through a compensation method. Through the "compensation method", the photovoltaic silicon waste is used to design and synthesize a silicon-based high-entropy alloy with uniform metallography and no segregation at one time, so as to solve the problem in the prior art that the oxide layer on the surface of cutting silicon waste is difficult to remove and the impurity elements are complex.

In order to achieve the above purpose, this present disclosure adopts the following technical solutions:

a method for designing and preparing a silicon-based high-entropy alloy by using photovoltaic silicon waste through a compensation method, specifically including the following steps:

(1) pretreating a silicon wafer cutting slurry to obtain silicon wafer cutting waste;

(2) performing high-temperature refining on the silicon wafer cutting waste and furnace cooling to obtain a refined silicon ingot;

(3) crushing the refined silicon ingot, melting with the solvent metal, performing directional solidification after the metal is completely melted, and furnace cooling to obtain a silicon-based high-entropy alloy precursor;

(4) cutting the silicon-based high-entropy alloy precursor along the interface between the silicon-rich region and the silicon-based alloy to separate and obtain the silicon-rich region for later use;

(5) preparing a target metal material according to the composition ratio of the silicon-based high-entropy alloy; and (6) smelting the silicon-rich region and the target metal material, standing and holding at a temperature, pouring into a mold, and furnace cooling to obtain the silicon-based high-entropy alloy.

Further, in the above step (1), the silicon wafer cutting slurry is the untreated silicon powder-containing cutting waste liquid generated during the production and cutting process of a single crystal silicon rod and/or a polycrystalline silicon rod.

Further, in the above step (1), the pretreating includes solid-liquid separation, dehydration and drying under the conditions of oxygen isolation or inert gas. More further, the drying is vacuum drying, at the temperature of 60-100° C., preferably 80° C., 85° C. or 90° C., and the pressure of not higher than −0.6 Bar.

The beneficial effect of adopting the above further solution is that, through the pretreating, the oxide layer on the surface of the silicon wafer cutting waste can be reduced and oxidation can be prevented.

Further, in the above step (2), the high-temperature refining equipment is an induction furnace or an electric arc furnace; the temperature of the high-temperature refining is not less than 1,600° C., preferably 1,650° C., 1,800° C. or 1,850° C.; the pressure of the high-temperature refining is not higher than 50 Pa or an inert gas is introduced under a normal pressure; the time of the high-temperature refining is 0.5-3 h, preferably 0.5 h or 1 h.

The beneficial effect of adopting the above further solution is that, through the high-temperature refining, volatile impurities (including 0, P, Al, Ca, etc.) such as oxygen can be removed from the silicon wafer cutting waste.

Further, in the above step (3), the solvent metal is at least one of aluminum (Al), tin (Sn) and copper (Cu).

The beneficial effect of adopting the above further solution is that the solvent metal selected in the present disclosure has a certain adsorption effect on metal impurities in the refined silicon ingot.

Further, in the above step (3), the melting equipment is a directional solidification resistance furnace or a directional solidification induction furnace; the melting temperature is not less than 1,450° C., preferably 1,450° C. or 1,500° C.; the melting pressure is not higher than 50 Pa or an inert gas is introduced under normal pressure; and the time for directional solidification is 0.5-80 h, preferably 6.5 h, 10 h or 18 h.

The beneficial effect of adopting the above further solution is that, through melting and directional solidification, partial metal impurities such as Fe, Ti, and Ni can be removed, without requiring complete removal, and a certain amount of solvent metal can be introduced in a controllable manner. The residual metal impurities and the introduced solvent metal form the target metal material required for the subsequent preparation of the silicon-based high-entropy alloy, shortening the impurity removal process.

Further, in the above step (5), the target metal material comprises at least four of chromium (Cr), aluminum (Al), iron (Fe), copper (Cu), tin (Sn), germanium (Ge), antimony (Sb), manganese (Mn), cobalt (Co), nickel (Ni), gallium (Ga) and niobium (Nb), preferably chromium, aluminum, iron and copper, or aluminum, tin, germanium, gallium and niobium, or iron, copper, tin, germanium and antimony.

Further, in the above step (6), the smelting equipment is an induction furnace or an electric arc furnace; the smelting temperature is not less than 1,450° C., preferably 1,550° C., 1,800° C. or 2,500° C.; and the smelting pressure is not higher than 50 Pa or an inert gas is introduced under normal pressure.

Further, in the above step (6), the time for standing and holding at a temperature is 0.5-2.5 h, preferably 0.5 h.

Further, in the above step (6), the silicon-based high-entropy alloy is an Al—Cr—Cu—Fe—Si high-entropy alloy, a Nb—Al—Ga—Ge—Si—Sn high-entropy alloy or a Ge—Si—Sn—Cu—Fe—Sb high-entropy alloy, the atomic mass percentage of each element is 5% to 35%, and the sum of the atomic mass percentages of all elements is 100%. More further, the silicon-based high-entropy alloy is an $Al_2CrCuFeSi$ high-entropy alloy, a $Nb_3(Al_{0.1}Ga_{0.1}Ge_{0.2}Si_{0.3}Sn_{0.3})$ high-entropy alloy or a $Ge_2Si_2SnCu_{0.5}Fe_{0.5}Sb_{0.5}$ high-entropy alloy.

It can be seen from the above technical solution that compared with the prior art, the beneficial effects of the present disclosure are as follows.

1. The present disclosure starts from an interdisciplinary perspective, develops a method and a route of "vacuum refining combined with solvent refining to assist silicon waste purification—alloying design and preparation for high-entropy alloy regeneration and utilization" by combining the vacuum refining and electromagnetic melting with the first proposed "compensation concept", according to the unique physical and chemical properties of diamond wire cutting silicon waste in the photovoltaic industry and its natural "endowment" as a raw material for preparing the silicon-based high-entropy alloy, and has the advantages of short process, low cost, large-scale value-added utilization, environmental protection, no pollution and sustainable development.

2. The present disclosure adopts the vacuum/inert gas atmosphere condition, which avoids secondary oxidation of raw materials and simultaneously improves the impurity removal effect, and has the advantages of high efficiency and energy saving.

3. Since silicon waste itself contains metal impurities such as iron, nickel, aluminum, and copper, the present disclosure can omit the impurities removal procedure of some metals, shorten the purification process flow, and directly prepare the high-entropy alloy by adding target elements to the obtained silicon-based alloy.

4. The present disclosure utilizes electromagnetic metallurgy technique to controllably introduce a certain amount of solvent metals such as aluminum, tin and copper, thereby further removing non-target impurity elements in the silicon waste while lowering the smelting temperature. The added solvent metals are used as raw materials for the subsequent preparation of the silicon-based high-entropy alloy, thereby achieving the purpose of preparing the silicon-based high-entropy alloy material precursor.

5. The present disclosure proposes a new thinking for designing and preparing the silicon-based high-entropy alloy utilizing the "compensation method", which can shorten the impurity removal process, realizes the preparation of high-quality high-entropy alloy material through reasonable composition adjustment and microstructure control.

6. The present disclosure addresses the physical and chemical characteristics of diamond wire cutting silicon waste, such as low silicon recovery rate and multiple impurity elements, is highly suitable for preparing a multi-component alloy material (i.e., the high-entropy alloy material), and aims to fully utilize the existing resource endowment of silicon waste to combine it with high-entropy alloy to transform the waste into high-performance alloy material, thus turning waste into treasure.

DETAILED DESCRIPTION OF EMBODIMENTS

The technical solutions in the embodiments of the present disclosure will be described clearly and completely below. Obviously, the described embodiments are only some of the embodiments of the present disclosure, not all of the embodiments. Based on the embodiments in the present disclosure, all embodiments obtained by a person ordinarily skilled in the art without creative work are within the scope of protection of the present disclosure.

Example 1

The method for designing and preparing a silicon-based high-entropy alloy by using photovoltaic silicon waste through a compensation method specifically included the following steps:
(1) performing solid-liquid separation and dehydration in sequence under an oxygen isolation condition on the untreated silicon powder-containing cutting waste liquid generated during the production and cutting process of the single crystal silicon rod, and drying and dehydrating to a constant weight in a vacuum drying oven at a temperature of 85° C. and a pressure not higher than −0.6 Bar to obtain silicon wafer cutting waste;
(2) placing the silicon wafer cutting waste in a graphite crucible, then placing the graphite crucible in a vacuum induction furnace for high-temperature refining, where the pressure in the furnace was not higher than 50 Pa, heating for 0.5 h and then holding at the temperature of 1,650° C. for 1 h, and furnace cooling to obtain a refined silicon ingot;
(3) crushing the refined silicon ingot and placing in a vacuum directional solidification resistance furnace together with the solvent metal aluminum for melting, where the temperature was 1,450° C. and the pressure in the furnace was not higher than 50 Pa, cooling to the liquidus temperature of the Si—Al system of 1,060° C. after the metal was completely melted, solidifying upward directionally at a rate of 1 m/s for 18 h, and furnace cooling to obtain a silicon-based high-entropy alloy precursor;
(4) cutting the silicon-based high-entropy alloy precursor along the interface between the silicon-rich region and the Si—Al alloy to separate and obtain the silicon-rich region for later use;
(5) preparing a target metal material of chromium, aluminum, iron and copper according to the composition ratio of $Al_2CrCuFeSi$ high-entropy alloy; and
(6) placing the silicon-rich region and the target metal material of chromium, aluminum, iron and copper in a vacuum induction furnace for smelting, where the temperature was 1,800° C. and the pressure in the furnace was not higher than 50 Pa, standing and holding for 0.5 h, pouring into a mold and furnace cooling to obtain an $Al_2CrCuFeSi$ high-entropy alloy.

Example 2

The method for designing and preparing a silicon-based high-entropy alloy by using photovoltaic silicon waste through a compensation method specifically included the following steps:
(1) performing solid-liquid separation and dehydration in sequence under an oxygen isolation condition on the untreated silicon powder-containing cutting waste liquid generated during the production and cutting process of the single crystal silicon rod, and drying and dehydrating to a constant weight in a vacuum drying oven at a temperature of 80° C. and a pressure not higher than −0.6 Bar to obtain silicon wafer cutting waste;
(2) placing the silicon wafer cutting waste in a graphite crucible, then placing the graphite crucible in a vacuum induction furnace for high-temperature refining, where the pressure in the furnace is not higher than 50 Pa, heating for 0.5 h and then holding at 1,800° C. for 1 h, and furnace cooling to obtain a refined silicon ingot.
(3) crushing the refined silicon ingot and placing in a vacuum directional solidification induction furnace together with the solvent metal tin for melting, where the temperature was 1,500° C. and the pressure in the furnace was not higher than 50 Pa, cooling to the liquidus temperature of the Si—Sn system of 1,332° C. after the metal was completely melted, solidifying downward directionally at a rate of 2 m/s for 10 h, and furnace cooling to obtain a silicon-based high-entropy alloy precursor;
(4) cutting the silicon-based high-entropy alloy precursor along the interface between the silicon-rich region and the Si—Sn alloy to separate and obtain the silicon-rich region for later use;
(5) preparing the target metal material of aluminum, tin, germanium, gallium and niobium according to the composition ratio of $Nb_3$ $(Al_{0.1}Ga_{0.1}Ge_{0.2}Si_{0.3}Sn_{0.3})$ high-entropy alloy; and
(6) placing the silicon-rich region and the target metal material of aluminum, tin, germanium, gallium and niobium in a vacuum induction furnace for smelting, where the temperature was 2,500° C. and the pressure in the furnace was not higher than 50 Pa, standing and holding for 0.5 h, pouring into a mold, and furnace cooling to obtain a $Nb_3$ $(Al_{0.1}Ga_{0.1}Ge_{0.2}Si_{0.3}Sn_{0.3})$ high-entropy alloy.

Example 3

The method for designing and preparing a silicon-based high-entropy alloy by using photovoltaic silicon waste through a compensation method specifically included the following steps:
(1) performing solid-liquid separation and dehydration in sequence under an oxygen isolation condition on the untreated silicon powder-containing cutting waste liquid generated during the production and cutting process of the polycrystalline silicon rod, drying and dehydrating to a constant weight in a vacuum drying oven at a temperature of 90° C. and a pressure not higher than −0.6 Bar to obtain silicon wafer cutting waste;
(2) placing the silicon wafer cutting waste in a graphite crucible, then placing the graphite crucible in a vacuum induction furnace for high-temperature refining, where the pressure in the furnace was not higher than 50 Pa, heating for 0.5 h and then holding at 1,850° C. for 0.5 h, and furnace cooling to obtain a refined silicon ingot.
(3) crushing the refined silicon ingot and placing in a directional solidification induction furnace together with the solvent metal copper for melting, where the temperature was 1,450° C. and an inert gas argon gas was introduced into the furnace, cooling to the liquidus temperature of the Si—Cu system of 1,075° C. after the metal was completely melted, solidifying downward directionally at a rate of 3 m/s for 6.5 h, and furnace cooling to obtain a silicon-based high-entropy alloy precursor;
(4) cutting the silicon-based high-entropy alloy precursor along the interface between the silicon-rich region and the Si—Cu alloy to separate and obtain the silicon-rich region for later use;

(5) preparing the target metal material of iron, copper, tin, germanium and antimony according to the composition ratio of $Ge_2Si_2SnCu_{0.5}Fe_{0.5}Sb_{0.5}$ high-entropy alloy; and (6) placing the silicon-rich region and target metal material of iron, copper, tin, germanium and antimony in a vacuum electric arc furnace for smelting, where the temperature was 1,550° C. and the pressure in the furnace was not higher than 10 Pa, heating to a molten state, and furnace cooling to obtain a $Ge_2Si_2SnCu_{0.5}Fe_{0.5}Sb_{0.5}$ high-entropy alloy.

Performance Testing

1. The $Al_2CrCuFeSi$ high-entropy alloy prepared in Example 1 was measured to have a hardness of up to 782 HV under a load of 1 kg, showing great application potential in the fields of aerospace, automobiles, ships, weapons, etc., where relatively high requirements are imposed on material density and hardness.

The $Nb_3(Al_{0.1}Ga_{0.1}Ge_{0.2}Si_{0.3}Sn_{0.3})$ high-entropy alloy prepared in Example 2 was measured to exhibit a superconducting transition in magnetization and resistivity as a function of the temperature at the temperature of 13 K.

3. The $Ge_2Si_2SnCu_{0.5}Fe_{0.5}Sb_{0.5}$ high-entropy alloy prepared in Example 3 was crushed, ball-milled at 350 rpm for 3.5 h in an argon atmosphere, and then assembled into a lithium-ion battery with the high-entropy alloy as the anode and a metal lithium foil as the cathode. Electrochemical properties thereof were tested, to obtain that the first discharge capacity reached as high as 1,528 mAh/g, the first charge capacity was 1,425 mAh/g, and the first coulombic efficiency was as high as 93%, indicating it had high reaction activity and reversibility.

The above description of the disclosed embodiments enables those skilled in the art to implement or use the present disclosure. Various modifications to these embodiments will be obvious to those skilled in the art, and the general principles defined herein may be implemented in other embodiments without departing from the spirit or scope of the present disclosure. Therefore, the present disclosure will not be limited to the embodiments shown herein, but will conform to the widest scope consistent with the principles and novel features disclosed herein.

The invention claimed is:

1. A method for designing and preparing a silicon-based high-entropy alloy by using photovoltaic silicon waste through a compensation method, comprising the following steps:

(1) pretreating a silicon wafer cutting slurry to obtain a silicon wafer cutting waste;

(2) performing high-temperature refining on the silicon wafer cutting waste, and furnace cooling to obtain a refined silicon ingot, wherein a temperature of the high-temperature refining is not less than 1,600° C.;

(3) crushing the refined silicon ingot and melting with a solvent metal, performing directional solidification after the metal is completely melted, and furnace cooling to obtain a silicon-based high-entropy alloy precursor;

(4) cutting the silicon-based high-entropy alloy precursor along an interface between a silicon-rich region and a silicon-based alloy to separate and obtain the silicon-rich region for later use; and (5) smelting the silicon-rich region and a target metal material, standing and holding at a temperature, pouring into a mold, and furnace cooling to obtain the silicon-based high-entropy alloy.

2. The method for designing and preparing a silicon-based high-entropy alloy by using photovoltaic silicon waste through a compensation method according to claim 1, wherein in the step (1), the silicon wafer cutting slurry is an untreated silicon powder-containing cutting waste liquid generated during a production and cutting process of a single crystal silicon rod and/or a polycrystalline silicon rod.

3. The method for designing and preparing a silicon-based high-entropy alloy by using photovoltaic silicon waste through a compensation method according to claim 1, wherein in the step (1), the pretreating comprises solid-liquid separation, dehydration and drying under a condition of oxygen isolation or an inert gas.

4. The method for designing and preparing a silicon-based high-entropy alloy by using photovoltaic silicon waste through a compensation method according to claim 1, wherein in the step (2), for the high-temperature refining, equipment is an induction furnace or an electric arc furnace, a pressure is not higher than 50 Pa or an inert gas is introduced under a normal pressure, and a time is 0.5-3 h.

5. The method for designing and preparing a silicon-based high-entropy alloy by using photovoltaic silicon waste through a compensation method according to claim 1, wherein in the step (3), the solvent metal is at least one selected from the group consisting of aluminum, tin and copper.

6. The method for designing and preparing a silicon-based high-entropy alloy by using photovoltaic silicon waste through a compensation method according to claim 1, wherein in the step (3), for the melting, equipment is a directional solidification resistance furnace or a directional solidification induction furnace, a temperature is not less than 1,450° C., a pressure is not higher than 50 Pa or an inert gas is introduced under a normal pressure, and a time for the directional solidification is 0.5-80 h.

7. The method for designing and preparing a silicon-based high-entropy alloy by using photovoltaic silicon waste through a compensation method according to claim 1, wherein in the step (5), the target metal material comprises at least four selected from the group consisting of chromium, aluminum, iron, copper, tin, germanium, antimony, manganese, cobalt, nickel, gallium and niobium.

8. The method for designing and preparing a silicon-based high-entropy alloy by using photovoltaic silicon waste through a compensation method according to claim 1, wherein in the step (5), for the smelting, equipment is an induction furnace or an electric arc furnace, a temperature is not less than 1,450° C., and a pressure is not higher than 50 Pa or an inert gas is introduced under a normal pressure.

9. The method for designing and preparing a silicon-based high-entropy alloy by using photovoltaic silicon waste through a compensation method according to claim 1, wherein in the step (5), a time for the standing and holding at the temperature is 0.5-2.5 h.

10. The method for designing and preparing a silicon-based high-entropy alloy by using photovoltaic silicon waste through a compensation method according to claim 1, wherein in the step (5), the silicon-based high-entropy alloy is an Al—Cr—Cu—Fe—Si high-entropy alloy, a Nb—Al—Ga—Ge—Si—Sn high-entropy alloy or a Ge—Si—Sn—Cu—Fe—Sb high-entropy alloy, an atomic mass percentage of each of elements is 5% to 35%, and a sum of the atomic mass percentages of all of the elements is 100%.

* * * * *